United States Patent [19]

Marui

[11] Patent Number: 5,471,643
[45] Date of Patent: Nov. 28, 1995

[54] RADIO TELECOMMUNICATION APPARATUS

[75] Inventor: Kuniyoshi Marui, Tokorozawa, Japan

[73] Assignee: Kabushiki Kaisha Toshiba, Kawasaki, Japan

[21] Appl. No.: 647,498

[22] Filed: Jan. 29, 1991

[30] Foreign Application Priority Data

Jan. 31, 1990 [JP] Japan ................. 2-20888

[51] Int. Cl.⁶ .................................. H04Q 7/32
[52] U.S. Cl. ................. 455/33.1; 455/54.1; 455/89; 379/59
[58] Field of Search ............... 455/33, 186, 33.1, 455/33.4, 186.1, 186.2, 54.1, 56.1; 379/60, 63, 58, 59

[56] References Cited

U.S. PATENT DOCUMENTS

| | | | |
|---|---|---|---|
| 4,233,473 | 11/1980 | Frost | 179/2 |
| 4,535,200 | 8/1985 | Himmelbauer et al. | 379/63 |
| 4,672,657 | 6/1987 | Dershowitz | 379/63 |
| 4,677,653 | 6/1987 | Weiner et al. | 379/58 |
| 4,734,928 | 3/1988 | Weiner et al. | 379/59 |
| 4,737,976 | 4/1988 | Borth et al. | 379/63 |
| 4,742,560 | 5/1988 | Arai | 455/33 |
| 4,761,806 | 8/1988 | Toki | 379/61 |
| 4,775,999 | 10/1988 | Williams | 379/59 |
| 4,831,647 | 5/1989 | D'Avello et al. | 379/91 |
| 4,833,701 | 5/1989 | Comroe et al. | 379/60 |
| 4,833,702 | 5/1989 | Shitara et al. | 379/60 |
| 4,891,638 | 1/1990 | Davis | 340/825.44 |
| 4,903,322 | 2/1990 | Inahara et al. | 455/186 |
| 4,905,301 | 2/1990 | Krocopp et al. | 455/33 |
| 4,916,728 | 4/1990 | Blair | 379/62 |
| 5,012,234 | 4/1991 | Dulaney et al. | 455/186 |
| 5,020,091 | 5/1991 | Krolopp et al. | 379/60 |
| 5,042,063 | 8/1991 | Sakanishi et al. | 379/63 |
| 5,068,889 | 11/1991 | Yamashita | 379/63 |
| 5,086,513 | 2/1992 | Lawrence et al. | 455/186 |
| 5,101,500 | 3/1992 | Marui | 379/63 |

FOREIGN PATENT DOCUMENTS

0260763A3  9/1986  European Pat. Off. .
2172775A   3/1988  United Kingdom .

Primary Examiner—Edward F. Urban
Attorney, Agent, or Firm—Banner & Allegretti, Ltd.

[57] ABSTRACT

The cellular mobile telephone apparatus comprises a radio unit having an antenna which is connected to a base station provided in a cell via a radio channel, and a telephone unit which is connected to the radio unit via a line and is formed of a main unit and handset. A plurality of cells form a service area and the base stations included in the service area are connected to a mobile telephone switching office via lines. A system identification number representing the service area and a mobile identification number identifying the telephone apparatus within the service area are assigned to a user by a mobile telephone company. The telephone apparatus comprises a key-input section for inputting the identification numbers and an electrically erasable programmable ROM for storing the identification numbers input by the key-input section.

16 Claims, 4 Drawing Sheets

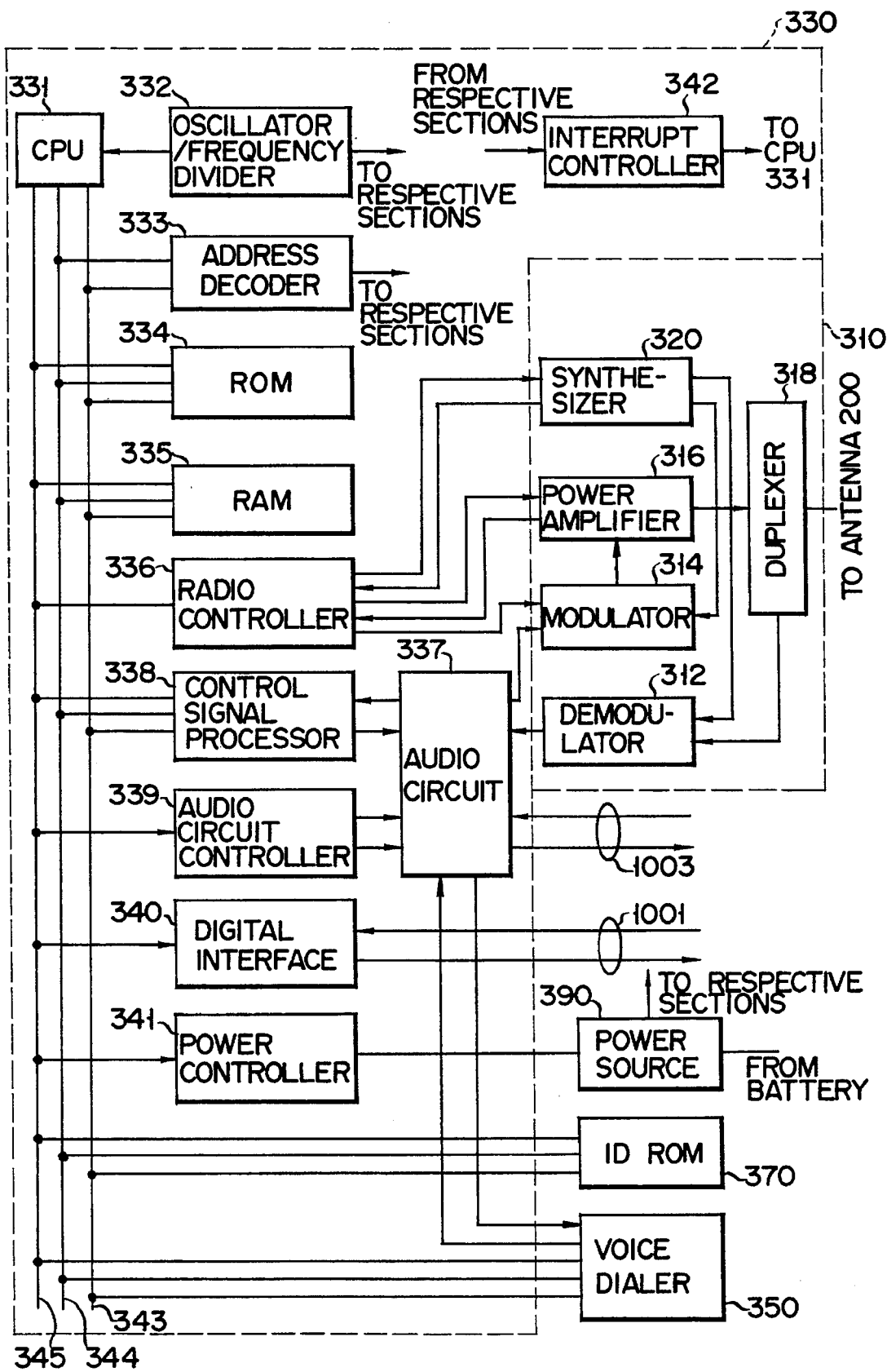
F I G. 2

RADIO TELECOMMUNICATION APPARATUS

BACKGROUND OF THE INVENTION

1. Field of the Invention

The present invention relates to the field of a radio telecommunication apparatus used in a radio telecommunication system, and more particularly to a radio telephone apparatus such as a cellular mobile telephone apparatus.

2. Description of the Related Art

In a conventional cellular mobile telephone system, a service area connected to a mobile telephone switching office is divided into a plurality of small zones or cells. A base station is provided for each cell and is connected to any cellular mobile telephone apparatus (hereinafter simply called mobile telephone apparatus) within the cell via a radio channel and connected to the mobile telephone switching office corresponding to the service area via a land line. The mobile telephone switching offices of a plurality of service areas are connected to telephone switching offices via land lines.

In order to use the mobile telephone service, a user must make a contact with a mobile telephone service company. When the user takes the telephone apparatus to a dealer of the mobile telephone service company, the serial number of the telephone apparatus is registered and a system identification (SID) number denoting a service area in which the user usually uses the telephone apparatus and an associated mobile identification (MID) number denoting the telephone number of the telephone apparatus are assigned to the telephone apparatus. These assigned ID numbers are stored in a read only memory (ROM) in the telephone apparatus by the dealer. Usually, a plurality of service areas are provided by the mobile telephone service company and a service fee is dependent on the location of the user. In order to determine the location of the user, the SID number stored in the ROM of the telephone apparatus is detected at the time of originating a call. The service area corresponding to the assigned SID number is called a "HOME" area and the user within the "HOME" area is called a home area user. The other service area is called a "ROAM" area and the user within the "ROAM" area is called a roamer. A user fee for a call from the roamer is higher than that from the home area user. When a call is made from a mobile telephone apparatus, these ID numbers are automatically transmitted to the mobile telephone switching office covering the service area where the mobile telephone apparatus is located and the mobile telephone switching office can therefore distinguish the roamer and the home area user by checking the transmitted SID number.

Accordingly, if the user travels out the "HOME" area and enters a new area, the user must take the telephone apparatus to the dealer to change the stored SID and MID numbers to new SID and MID numbers corresponding to the new area in order to avoid an unreasonable increase of the user fee. Since the aforementioned numbers are changed and rewritten into the ROM by the dealer, it takes a lot of time to make such a change and the user requires to have a troublesome work.

In order to avoid this troublesome work, it has been attempted to store pairs of the SID and MID numbers corresponding to all the service areas covered by the telephone company in the telephone apparatus. The user only select a suitable pair of the SID and MID numbers by means of a switch when he or she changes the location. In some situations, however, the user does not exactly know in which area he or she is presently located. Thus, the user sometimes cannot select the proper ID numbers. Further, it is necessary to require a memory of a considerably great capacity in order to store all the pairs of the SID and MID numbers. Therefore, a high product cost results.

Those problems described above are also involved in a case where the user makes respective contacts with several telephone companies.

SUMMARY OF THE INVENTION

It is accordingly an object of the present invention to provide a radio telecommunication apparatus in which a system identification number denoting a home service area is easily changed.

Another object of the present invention is to provide a radio telecommunication apparatus in which the user changes the system identification number without increasing the capacity of a memory.

Still another object of the present invention is to provide a radio telecommunication apparatus in which the system identification number is changed to a correct number if the user travels into another service area.

According to the present invention, there is provided a radio communication apparatus which is available in a plurality of service areas, each of the service area being identified by a system identification number and served by one or more base stations, comprising a memory for storing first system identification data corresponding to the system identification data, an operator actuatable input device for inputting second system identification data and apparatus identification data designating the radio communication apparatus, a comparator for comparing the first system identification data stored in the memory and the second system identification data input by the input device, and a control circuit for registering the second system identification data and the apparatus identification data when the comparator detects that the first system identification data coincides with the second system identification data.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a detailed block diagram showing a radio unit of the mobile telephone apparatus shown in FIG. 1;

DETAILED DESCRIPTION OF THE PREFERRED EMBODIMENTS

A preferred embodiment of a radio telecommunication apparatus according to the present invention will now be described with reference to the accompanying drawings.

Figure 1:
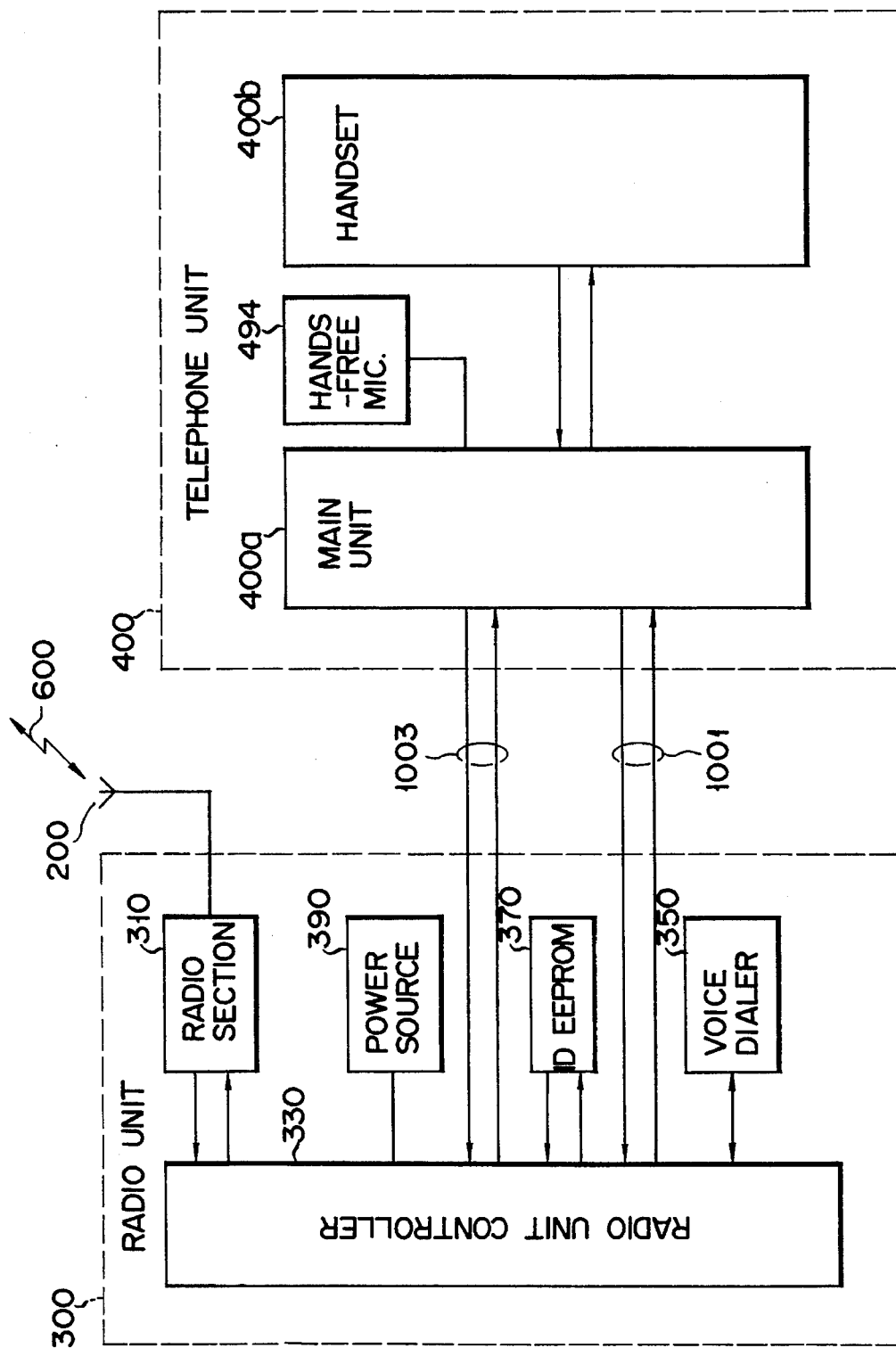
FIG. 1 is a block diagram showing a whole arrangement of a cellular mobile telephone apparatus according to an embodiment of the present invention.

FIG. 1 is a block diagram showing a whole arrangement of a cellular mobile telephone apparatus according to an embodiment of the present invention. The mobile telephone apparatus of this embodiment is formed of an antenna 200, a radio unit 300, and a telephone unit 400. The antenna 200 is mounted on an outer body surface of an automobile (not shown). The radio unit 300 is provided within the trunk of the automobile. The telephone set 400 is formed of a main unit 400a and a handset 400b and is mounted near a driver's seat inside the automobile.

The radio unit 300 comprises a radio section 310 for establishing a radio channel 600 between the antenna 200 and the base stations through the antenna 200, a radio unit controller 330, a voice dialer 350, an ID EEPROM 370, and a power source 390. The radio unit controller 330 controls the overall operations of the apparatus. The voice dialer 350 speech-recognizes in order to generate the dial number signal based on the speech of the user and synthesizes a speech to provide various voice information. The ID EEPROM 370 is formed of an EEPROM (electrically erasable programmable ROM) for storing the mobile identification (MID) number for denoting the telephone number of the apparatus, the system identification (SID) number denoting the service area (home area), and a received system identification (RSID) number which denotes the service area in which the apparatus presently locates and is transmitted from the base station upon the power-on of the apparatus. The SID and MID numbers are assigned to the user by the telephone service company before using the mobile telephone. If the telephone service company includes a plurality of service areas, the SID and MID numbers are assigned for each service area and one of pairs of SID and MID is stored in the ID EEPROM 370. The power source 390 supplies power from a battery mounted in the automobile to the respective components of the apparatus.

The details of the radio unit 300 is shown in FIG. 2. The radio section 310 comprises a demodulator 312, a modulator 314, a power amplifier 316, a duplexer 318, and a synthesizer 320. The demodulator 312 demodulates a radio signal which is transmitted from the base station to be received via the radio channel 600, antenna 200, and duplexer 318. It should be noted that this radio signal includes an audio sound signal, a control signal, and so on. The modulator 314 modulates an audio signal and a control signal which are output from the radio unit controller 330 and generates a radio signal to be transmitted via the power amplifier 316, duplexer 318, antenna 200, and radio channel 600.

The power amplifier 316 amplifies the transmission signal which is output from the modulator 314. The amplification factor of the power amplifier 316 may be continuously varied or varied in a step-wise manner, e.g., 8-step variable. The duplexer 318 supplies the reception signal which is received through the radio channel 600 and antenna 200 to the demodulator 312 and the transmission signal from the modulator 314 and power amplifier 316 to the antenna 200.

The synthesizer 320 is formed of a channel selection local oscillator and specifies a frequency from which signals are demodulated by the demodulator 312 and a frequency to which signals are modulated by the modulator 314. For example, 666 channels can be selected by the synthesizer 320.

The radio unit controller 330 comprises a central processing unit (CPU) 331, an oscillator/frequency divider 332, an address decoder 333, a ROM 334, a RAM 335, a radio controller 336, an audio circuit 337, a control signal processor 338, an audio circuit controller 339, a digital interface 340, a power controller 341, and an interrupt controller 342. The CPU 331 is connected to these components through a data bus 343, an address bus 344, and a control bus 345, both of which are formed of 8-bit bus lines.

The CPU 331 controls the whole operation of the radio unit controller 330. The oscillator/frequency divider 332 supplies clocks to the CPU 331 and frequency-divides the clocks in order to supply appropriate frequency-divided pulses as timing pulses to respective sections of the telephone apparatus requiring them.

The address decoder 333 outputs a predetermined operation signal in response to the control signal from the CPU 331. The ROM 334 stores various programs required for operation of the CPU 331 therein. The RAM 335 stores various types of data during processing for use by the CPU 331.

The radio controller 336 controls the radio section 310 in response to instructions from the CPU 331. For example, the radio controller 336 sends a signal indicative of available frequencies to the synthesizer 320, a signal indicative of an amplification factor to the power amplifier 316, and a signal indicative of the modulation parameters to the modulator 314. In order to prevent an erroneous operation, the radio controller 336 receives, for example, a step-out signal from the synthesizer 320 and an output power detection signal from the power amplifier 316 and sends them to the CPU 331.

The audio circuit 337 extracts a control signal and an audio signal from the received signals demodulated by the demodulator 312 and supplies the control signal to the control signal processor 338, the audio signal to the voice synthesizer 350, and the audio signal to the telephone unit 400 via an audio line 1003. The audio circuit 337 also supplies a control signal from the control signal processor 338, an audio signal from the voice dialer 350, and an audio signal from the telephone unit 400 via the audio line 1003 to the demodulator 314. It should be noted that the audio circuit 337 also shapes the waveform of the control signal to be sent to the control signal processor 338 in a particular signal format and filters the control signal to be supplied to the modulator 314.

The control signal processor 338 performs bit and word synchronizations with respect to the control signal supplied from audio circuit 337. Maintaining the required synchronization, the control signal processor 338 converts the serial control signals, including control data received from the base station, into parallel control data signals. The processor 338 further converts the parallel control data signals to be transmitted to the base station into serial control signals. The control signal is sent to and received from the base station via the audio circuit 337.

The audio circuit controller 339 performs various control regarding to the audio circuit 337. Under the control of the audio circuit controller 399, for example, the audio circuit 337 supplies the received signal from the demodulator 312 to the control signal processor 338, voice dialer 350, or telephone unit 400 and enables either of a signal which is output from the control signal processor 338, voice dialer 350, or telephone set 400 to be selectively supplied to the audio circuit 337.

The digital interface 340 interfaces the data communication between the radio unit 300 and the telephone unit 400 via a control line 1001. The power controller 341 controls the power source 390 and sets a voltage which is supplied from the battery of the automobile to the power source 390 to a predetermined level. The voltage having the predetermined level is supplied to the respective circuit components of the whole telephone apparatus.

Responsive to an interrupt instruction from the respective circuit components, the interruption controller 342 makes an interruption to CPU 331 to start various control operations.

Figure 3:
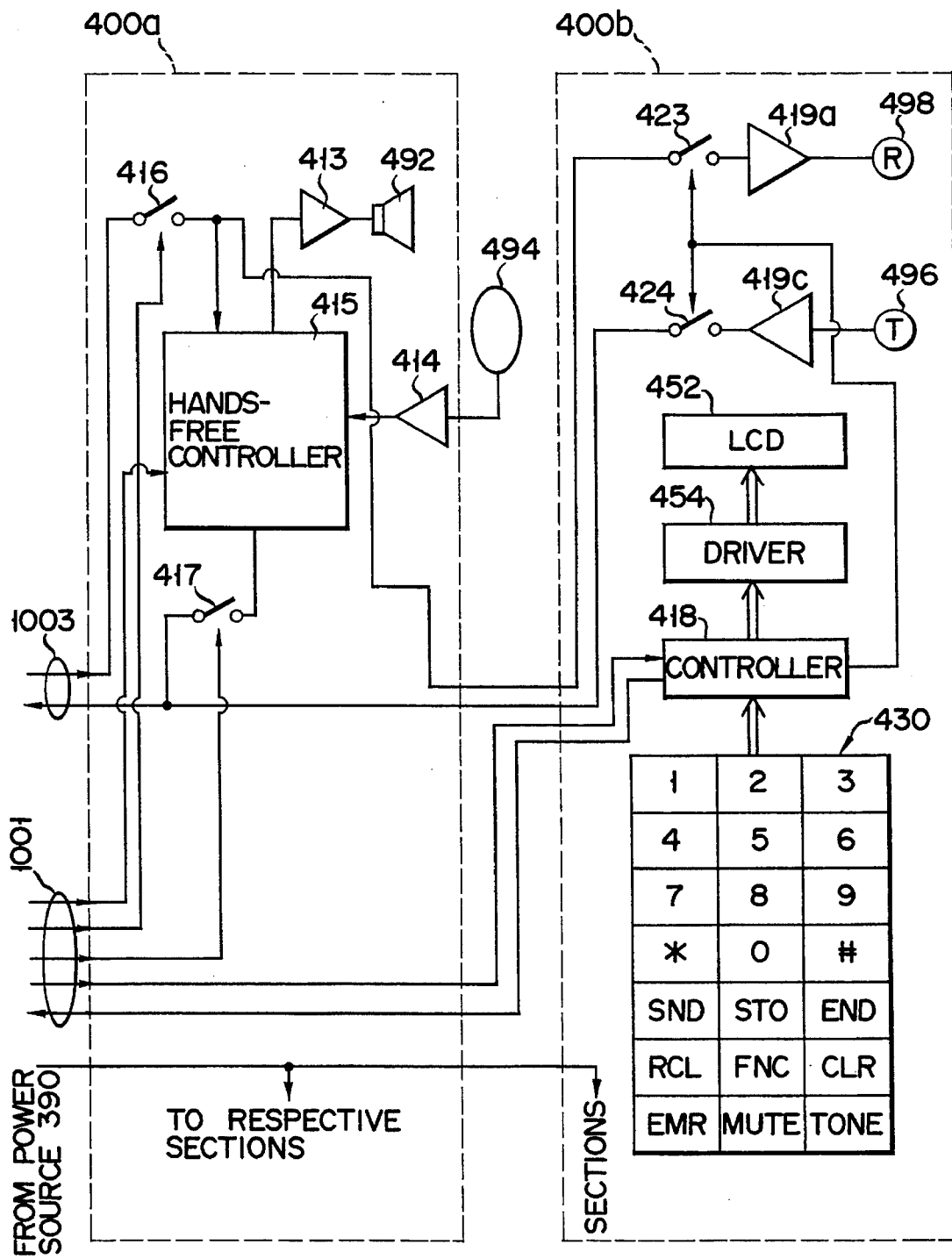
FIG. 3 is a detailed block diagram showing a telephone unit of the mobile telephone apparatus shown in FIG. 1.

The details of the telephone unit 400 is shown in FIG. 3. The telephone unit 400 is formed of a main unit (cradle) 400a and handset 400b. A hands-free microphone 494 is connected to the main unit 400a. The main unit 400a comprises amplifiers 413 and 414, a hands-free controller 415, switches 416 and 417, and a speaker 492.

The amplifier 413 amplifies a speech signal which is supplied from the audio circuit 337 in the radio unit 300 via the audio line 1003 and hands-free controller 415 and sends the amplified speech signal to the speaker 492. The amplifier 414 amplifies a speech signal, which is input from the hands-free microphone 494, and sends it to the hands-free controller 415.

The hands-free circuit 415 prevents howling resulting from an acoustic coupling between the speech signal (transmission speech) input from the hands-free microphone 494 and the speech signal (reception speech) output from the speaker 492. The switch 416 is used for switching of whether or not the transmission speech signal which is sent from the audio circuit 337 is output from the speaker 492. The switch 417 is used for switching of whether or not the reception speech signal which is input from the hands-free microphone 494 is output to the audio circuit 337. The switching of the switches 416 and 417 is accomplished by the control signal from the digital interface 340 via the control line 1001.

The handset 400b comprises a controller 418, amplifiers 419a and 419c, switches 423 and 424, a liquid crystal display (LCD) device 452, an LCD driver 454, a key section 430 having a plurality of key pads, a handset microphone 496, and a handset receiver 498.

The controller 418 controls the whole operation of the handset 400b and sends out a control signal coming from the key section 430 to the radio unit controller 330 in the radio unit 300 via the control line 1001 in response to a control signal sent from the radio unit controller 330 via the control line 1001.

The amplifier 419a amplifies a speech signal which is supplied from the audio circuit 337 via the audio line 1003 and the switch 423 and outputs the amplified speech signal to the handset receiver 498. The amplifier 419c amplifies a speech signal which is input from the handset microphone 496 and sends the amplified speech signal to the audio circuit 337 via the switch 424 and audio line 1001.

The switch 423 is used for switching of whether or not a speech signal supplied from the audio circuit 337 is sent to the handset receiver 498. The switch 424 is used for switching of whether or not a speech signal input from the handset microphone 496 is sent to the audio circuit 337. The switching of the switches 423 and 424 is accomplished by the controller 418.

The LCD device 452 is comprised of a multi-digit numeral display section and a display section representative of the various functions. The LCD driver 454 drives the LCD device 452 to effect a predetermined display under the control of the controller 418. The key section 430 comprises, for example, key pads of numerical keys "0" to "9" and function keys "*", "#", "SND", "STO", "END", "RCL", "FNC", "CLR", "EMR", "MUTE", and "TONE". Upon the depression of the key pads, the corresponding key is identified by the controller 418.

The operation of the mobile telephone apparatus of this embodiment will be explained. First, the communication service system using a mobile telephone apparatus according to the present invention will be explained. As in the conventional system, a service area is divided into a plurality of cells. A base station is located in the respective cell and connected to a land line via a mobile telephone switching office. Each mobile telephone apparatus within each cell establishes radio channels with the corresponding base station. The radio channels include speech channels for allowing a speech communication, and control channels comprising dedicated channels ("D" channels), paging channels ("P" channels), and access channels ("A" channels).

The "D" channels allow system information to be transmitted from the base station to the mobile telephone apparatus. The mobile telephone apparatus is initialized by the system information transmitted through the "D" channels.

The "P" channels allow the system information and a called signal representing that the mobile telephone apparatus is called to be transmitted from the base station to the mobile telephone apparatus.

The "A" channels allow the system information and a speech channel designation signal to be transmitted from the base station to the mobile telephone apparatus and a call origination signal and a called response signal to be transmitted from the mobile telephone apparatus to the base station.

The mobile telephone apparatus receives signals via the "P" channels in a standby state and, upon receipt of the called signal, transmits the called response signal to the base station over the "A" channels. Upon receipt of a speech channel designation signal from the base station via the "A" channels, a signal is received over the designated channel.

For originating the call, the mobile telephone apparatus transmits a call origination signal to the base station via the "A" channel. Upon receipt of the speech channel designation signal from the base station via the "A" channel, a signal is transmitted via the designated channel.

The aforementioned system information includes, for example, a system identification (SID) number representative of a service area where the base station is located or the telephone apparatus is located. Upon a predetermined communication, for example, a position registration and a call origination or termination, between the mobile telephone apparatus and the base station, the SID is transmitted from the base station to the mobile telephone apparatus and it is stored in the ID EEPROM 370. The SID transmitted from the base station and stored in the ID EEPROM 370 is hereinafter referred to as a reception system identification (RSID) number.

In order to use the mobile telephone service presented by a mobile telephone service company, the user makes a contact with the mobile telephone service company to have the serial number of the telephone apparatus registered and to have the SID number denoting the service area in which the user is located assigned and the associated MID number denoting the telephone number of the apparatus within the assigned service area. If the mobile telephone service company has many service areas, the ID numbers are assigned for each service area. A pair of SID and MID numbers, corresponding to the service area in which the user is presently located, is stored in the ID EEPROM 370. The service area corresponding to the SID stored in the ID EEPROM 370 is called a home area and the user within the home area is called a home area user. If the user travels out of the home area and enters another area, the new area is called a roam area and the user within the roam area is called a roamer. A user fee for a call from the roamer is higher than that from the home area user. When a call is originated from a mobile telephone apparatus, the SID and MID numbers are transmitted to the mobile telephone switching office covering the service area where the mobile telephone apparatus is located and the mobile telephone switching office can therefore distinguish the roamer and the home area user by checking the transmitted SID number.

Accordingly, if the user travels out the home area and enters the roam area, it is necessary to change the SID and MID numbers stored in the ID EEPROM 370 in order to avoid the increase of the user fee. According to this embodiment, the ID numbers can be easily changed by the user as follows.

Figure 4:
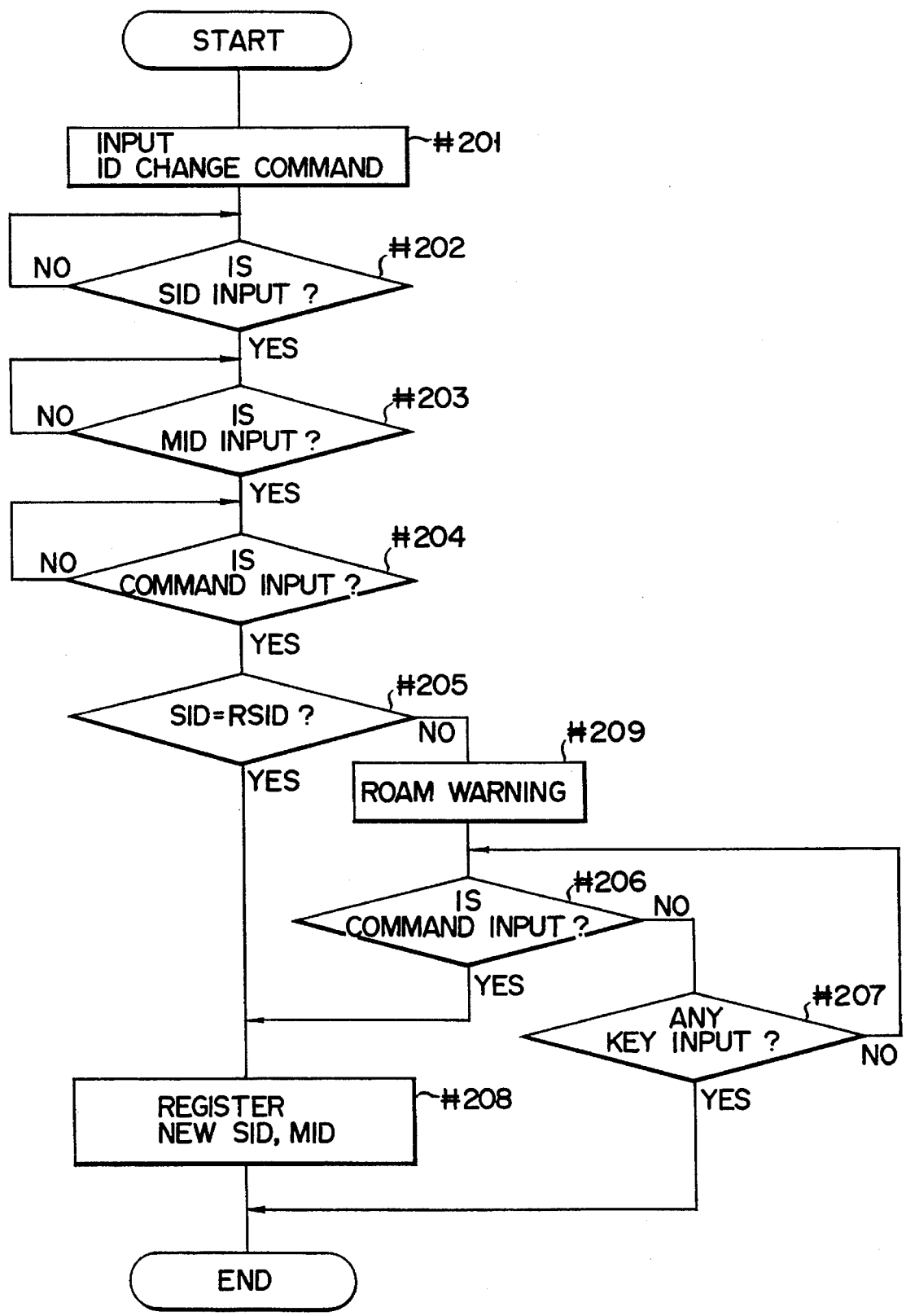
FIG. 4 is a flowchart explaining an operation for changing identification numbers of the mobile telephone apparatus.

FIG. 4 illustrates the operation for changing the SID and MID numbers. When the user inputs the command for changing the ID numbers, the interrupt controller 342 makes the CPU 331 start the flowchart shown in FIG. 4. At step #201, the user depresses the keys "FNC", "*", and "6" on the key section 430 in order to begin the ID number changing operation.

At step #202, the user operates some of the numeral keys "0" to "9" and the function keys "*" and "#" on the key section 430 to enter, for example, a five-digit SID number corresponding to the service area where the user is presently located. The entered SID number is supplied by the controller 418 to the LCD unit 452 where it is displayed. If the user finds that the entered SID number is wrong, the user enters a new SID number. A signal corresponding to the entered SID number is output from the controller 418 to the radio unit controller 330 in the radio unit 300 and then supplied via the digital interface 340 to the CPU 331 where it is decoded. The SID number is once stored in the RAM 335.

At step #203, the user operates some of the numeral keys "0" to "9" and the function keys "*" and "#" on the key section 430 to enter, for example, a ten-digit MID number denoting the telephone number associated with the entered SID number. The entered MID number is supplied by the controller 418 to the LCD unit 452 where it is displayed. If the user finds that the entered MID number is wrong, the user enters a new MID number. A signal corresponding to the entered MID number is output from the controller 418 to the radio unit controller 330 in the radio unit 300 and then supplied via the digital interface 340 to the CPU 331 where it is decoded. The MID number is also once stored in the RAM 335.

At step #204, the user operates the keys "FNC" and "6" on the key section 430 to input the command for allowing the entered SID and MID numbers to be registered and stored in the ID EEPROM 370.

At step #205, the CPU 331 reads out the RSID number from the ID EEPROM 370 and compares it with the entered SID stored in the RAM 335. If it is detected that the entered SID number coincides with the RSID number, the CPU 331 registers the entered SID and MID numbers into the ID EEPROM 370 at step #208. This indicates that the SID number corresponding to the service area where the user is located is entered by the user, i.e., a correct SID number is entered. At this time, the entered SID number displayed on the LCD is blanked and only the MID number is displayed. Thus, the ID numbers are easily updated by the user. Therefore, it is not necessary to require the ID EEPROM of a considerably great capacity for storing all the ID numbers.

If it is detected that the entered SID number does not coincide with the RSID number, the CPU 331 drives the speaker 492 to generate a warning tone for indicating that the user will be regarded as a roamer at step #209. If the user operates the keys "FNC" and "6" on the key section 430 to input the command for allowing the entered SID and MID numbers to be registered at step #206, the CPU 331 registers the entered SID and MID numbers into the ID EEPROM 370 at step #208. This procedure may be performed when the SID number is previously changed before the user enters the new area.

If the user knows that the wrong SID is entered due to the warning at step #209, the user depresses any other key at step #207 in order to cancel the entered SID and MID number. If the other key is depressed at step #207, the ID number changing operation is ended.

Thereafter, this mobile telephone apparatus can originate and terminate a call on the basis of the registered SID and MID numbers. For example, when the user receives a mobile telephone service using the new SID number which coincides with the RSID number, the user is regarded as a home area user. When the user receives a mobile telephone service using the new SID number which does not coincide with the RSID number, the user is regarded as a roamer.

It is to be noted that the user has to previously register a serial number of the mobile telephone on the mobile telephone service company and to make a predetermined contact with the mobile telephone service company to have assigned the SID and MID numbers. Upon the origination of a call by using an unregistered ID numbers, the base station is responsive to the ID numbers to ascertain whether or not there is a corresponding registered number. The unregistered user therefore cannot secure the mobile telephone service.

According to the embodiment described above, the assigned ID numbers stored in the ID EEPROM 370 can be readily rewritten, obviating the need to take the mobile telephone apparatus to the dealer of the telephone service company so that the ID numbers may be changed to other ones. Further, the user can readily register new ID numbers through the operation of the keys on the key section 430. It is, therefore, not necessary to provide any greater-capacity memory for storing all the ID numbers corresponding to all the service areas. The resultant apparatus incurs no added cost.

Although, in the aforementioned embodiment, the SID number has been explained as being entered by the operation of the keys on the key section 430, it is not necessary to enter the SID number. The RSID number may be displayed on the LCD 452 and then registered into the ID EEPROM 370 through the operation of, for example, "FNC" and "6" keys on the key section 430 after the user recognizes the displayed RSID number. In this case, it is prevented that the wrong SID number is registered.

Further, the present invention can be applied to not only the mobile telephone apparatus but also other radio telephone apparatus, such as a portable telephone and transportable type radio telephone. It is also applicable to a cellular type cordless telephone and the like.

As described above, the radio telecommunication apparatus of the present invention allows a system identification number denoting the service area and stored in a memory to be easily changed by a user by means of a key operation.

Since the system identification number corresponding to the service area where the user is presently located is stored in the memory, a large capacity of the memory is not required for storing the identification number.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although an embodiment applied to a mobile telephone apparatus has been described, it is apparent to those skilled in the art that this invention may be easily applied to any kind of radio telecommunication apparatus, such as a transportable type radio telephone or a portable type radio telephone. This invention is also applicable to a cordless telephone system. Furthermore, the concepts of the present invention may be applied to a data transmission apparatus used in a cellular radio telecommunication system.

What is claimed is:

1. A radio telecommunication subscriber unit for use in a radio telecommunication system, wherein said radio telecommunication system encompasses a plurality of service areas each having a system identifier, said radio telecommunication subscriber unit comprising:

storing means for storing a system identifier corresponding to a home service area of said radio telecommunication subscriber unit;

input means, operable by a subscriber, for inputting a system identifier corresponding to a service area of said radio telecommunication system; and supplying means for supplying the subscriber-input system identifier to said storing means to designate the service area corresponding to the subscriber-input system identifier as a home service area.

2. The radio telecommunication subscriber unit according to claim 1, further comprising:

display means for displaying the subscriber-input system identifier.

3. The radio telecommunication subscriber unit according to claim 2, wherein said display means is a liquid crystal display.

4. The radio telecommunication subscriber unit according to claim 1, wherein said storing means includes means for storing a subscriber unit identifier such as a telephone number for identifying said subscriber unit within a home service area.

5. The radio telecommunication subscriber unit according to claim 4, wherein said service areas each have an identification number, and the subscriber unit identifier is a subscriber unit identification number.

6. The radio telecommunication subscriber unit according to claim 1, wherein said storing means comprises a programmable read only memory.

7. The radio telecommunication subscriber unit according to claim 1, wherein said input means is a keypad.

8. A radio telecommunication subscriber unit for use in a radio telecommunication system, wherein said radio telecommunication system encompasses a plurality of service areas each having one or more base units which transmits a signal including a system identifier identifying a service area, said radio telecommunication subscriber unit comprising:

storing means for storing a system identifier corresponding to a home service area of said radio telecommunication subscriber unit;

receiving means for receiving a system identifier transmitted from a base unit;

input means, operable by a subscriber, for inputting a system identifier corresponding to a service area of said radio telecommunication system;

comparing means for comparing the received system identifier and the subscriber-input system identifier; and supplying means responsive to said comparing means for supplying the subscriber-input system identifier to said storing means when the received system identifier corresponds to the subscriber-input system identifier to designate the service area corresponding to the subscriber - input system identifier as a home service area.

9. The radio telecommunication subscriber unit according to claim 8, wherein said input means further comprises means for inputting a subscriber unit identifier for identifying said subscriber unit, said storing means further comprises means for storing said subscriber unit identifier and said supplying means further comprises means responsive to said comparing means for supplying the subscriber unit identifier to said storing means when the received system identifier corresponds to the subscriber-input system identifier.

10. The radio telecommunication subscriber unit according to claim 8, further comprising:

indicating means responsive to said comparing means for indicating when the received system identifier does not correspond to the subscriber-input system identifier.

11. The radio telecommunication subscriber unit according to claim 8, wherein said supplying means further comprises means responsive to a subscriber-input command for supplying the received system identifier to said storing means when the received system identifier does not correspond to the subscriber-input system identifier.

12. A method of identifying a home area for a radio telecommunication subscriber unit operating in a radio telecommunication system, wherein the radio telecommunication system encompasses a plurality of service areas each having one or more base units which transmits a signal including a system identifier identifying a service area, the method comprising the steps of:

storing a system identifier corresponding to a home service area of said radio telecommunication subscriber unit in a memory device;

receiving a system identifier transmitted from a base unit;

inputting a system identifier corresponding to a service area of said radio telecommunication system;

comparing the received system identifier and the input system identifier; and supplying the input system identifier to said memory device when the received system identifier corresponds to the input system identifier to designate the service area corresponding to the input system identifier as a home service area for said radio telecommunication subscriber unit.

13. The method according to claim 12, further comprising the steps of:

providing an indication when the received system identifier does not correspond to the input system identifier; and storing the input system identifier in the memory device in response to a subscriber input command when the received system identifier does not correspond to the input system identifier to designate the service area corresponding to the input system identifier as a home service area for said radio telecommunication subscriber unit.

14. The method according to claim 12, further comprising the step of:

displaying the input system identifier.

15. The method according to claim 12, further comprising the step of:

inputting a subscriber unit identifier identifying said radio telecommunication subscriber unit;

supplying the input subscriber unit identifier to said memory device when the received system identifier corresponds to the input system identifier or in response to a subscriber input command when the received system identifier does not correspond to the input system identifier.

16. A radio telecommunication system having a plurality of service areas, said radio telecommunication system comprising:

at least one base unit in each of said service areas transmitting a signal including a system identifier identifying a service area in which said respective base units are located;

a radio telecommunication subscriber unit comprising:

storing means for storing a system identifier corresponding to a home service area of said radio telecommunication subscriber unit;

input means, operable by a subscriber, for inputting a system identifier corresponding to a service area of said radio telecommunication system; and supplying means for supplying the subscriber-input system identifier to said storing means to designate the service area corresponding to the subscriber-input system identifier as a home service area.

\* \* \* \* \*